(12) United States Patent
Liu

(10) Patent No.: US 6,374,498 B1
(45) Date of Patent: Apr. 23, 2002

(54) PORTABLE PRUNER

(76) Inventor: Changzhe Liu, 1st Floor, Wuwu Industrial Building, Dachon, Nanshan District, Shenzhen, 518057 (CN)

( * ) Notice: Subject to any disclaimer, the term of this patent is extended or adjusted under 35 U.S.C. 154(b) by 0 days.

(21) Appl. No.: 09/558,166

(22) Filed: Apr. 26, 2000

(30) Foreign Application Priority Data

Apr. 26, 1999 (CN) .......................... 99104224.7

(51) Int. Cl.$^7$ .......................... A01G 3/00; B26B 29/00
(52) U.S. Cl. .......................... 30/211; 30/241; 30/242; 30/233
(58) Field of Search .......................... 30/211, 242, 241, 30/135, 249, 250, 251, 286, 275.4, 296.1, 233, 341, 182

(56) References Cited

U.S. PATENT DOCUMENTS

| | | | | |
|---|---|---|---|---|
| 46,797 A | * | 3/1865 | Harris | 30/242 |
| 248,522 A | * | 10/1881 | Stanley | 30/251 |
| 470,586 A | * | 3/1892 | Morgan | 30/241 |
| 1,124,991 A | * | 1/1915 | Bartlett | 30/251 |
| 1,197,430 A | * | 9/1916 | Barnes et al. | 30/241 |
| 1,540,392 A | * | 6/1925 | Grow | 30/241 |
| 1,709,675 A | * | 4/1929 | Martini | 30/251 |
| 2,270,495 A | * | 1/1942 | Bernay | 30/242 |
| 3,594,903 A | * | 7/1971 | Schluchter | 30/242 |
| 3,657,813 A | * | 4/1972 | Knight | 30/296.12 |
| 3,855,699 A | * | 12/1974 | Charlett | 30/242 |
| 4,505,040 A | * | 3/1985 | Everts | 30/296.12 |
| 5,261,163 A | * | 11/1993 | Shearhart | 30/242 |

FOREIGN PATENT DOCUMENTS

| | | | | |
|---|---|---|---|---|
| DE | 962655 | * | 4/1957 | 30/241 |

* cited by examiner

*Primary Examiner*—Kenneth E. Peterson
*Assistant Examiner*—Thomas J Druan, Jr.
(74) *Attorney, Agent, or Firm*—Foley & Lardner

(57) ABSTRACT

A portable pruner comprises a shearing part, a transmission part and a driving part. By using the compound casing tube to achieve rigid axial transmission, the pruner is simple and handy in construction, and accurate and easy to pruning. It can be disassembled into several portions easy to carry and assembled at different lengths depending on the requirement, its effects of cutting are dependable, and so the portable pruner is suitable for pruning branches of various heights in extensive orchards and gardens, while ensuring the safety of the operation. At the same time, the efficiency of pruning trees is improved considerably.

3 Claims, 2 Drawing Sheets

PORTABLE PRUNER

FIELD OF THE INVENTION

The present invention relates to a tool for pruning fruit trees, which is, more specifically, a portable pruner.

BACKGROUND OF THE INVENTION

As is known, fruit trees need pruning every year, and so do the gardens for greening city areas. The conventional method for pruning trees is either using a ladder or fastening the shears to a bamboo pole and manipulating the shears by pulling the attached rope. The use of a ladder is very clumsy, because it is difficult to move it in the orchard where the ground is often uneven and the gardener has to climb up and down, thus increasing labor, reducing efficiency and causing hazards. The method of pruning with the shears fastened to the bamboo pole and pulling the rope is still highly labor-intensive. When the gardener is pulling the rope with one hand, he has to lift the bamboo pole with the other, and so it is very difficult to stabilize the pole. Moreover, it is very hard to use and carry such a long pole attached with a rope. Even pruning the tree for a short while may make the gardener uncomfortable, and doing it for a long time will give his hands blisters or make them raw. When he is cutting thicker branches with the shears fastened to the bamboo pole, he has to open shears wide, and especially when the branches are wet and slippery, it is difficult to cut them down.

Currently, a new type of shears is disclosed in the EPO under the Patent No. 2460 (LOOSEN), which won a prize in the Geneva International Invention Fair. Its characteristics lies in the two handles of the shears that can be extended to deal with the branches growing higher up. It looks like the steel scissors on the market and seems cumbersome. The handles can be extended as long as just one meter, and so the shears still cannot reach the branches of tall trees.

SUMMARY OF THE INVENTION

The present invention seeks to offset the disadvantages of the prior art by providing a portable pruner for pruning fruit trees of various heights in extensive orchards and gardens. In order to carry and store it easily, the portable pruner can be disassembled into several portions at suitable lengths. In operation, it can be assembled at different lengths depending on the requirement, such as 0.5–5 meters. Without any auxiliary tools, the pruner can be taken to pieces or put together in half a minute and cut the branches dependably and easily.

The object of the invention is achieved by the following technical solution.

A portable pruner comprises a shearing part, a transmission part and a driving part.

The shearing part comprises a hook-shaped cutting edge 1, a slide cutting edge 2, a slide link 10 and a restoring spring 3. The slide cutting edge 2 is fixed to the top of the slide link 10, which is installed in the tube hole under the hook-shaped cutting edge 1. The bottom of the tube hole under the hook-shaped cutting edge 1 is connected to a connecting link 4 by the threaded coupling;

The transmission part comprises a connecting link 4, a transmission link 5 and a restoring spring 3. The transmission link 5 is installed in the inner of the tube, with the exterior of its upper portion fitted with the restoring spring 9 and the top portion connected to the end of the slide link 10. The lower end of the connecting link 4 is connected to a driving handle 6 by the threaded coupling;

The driving part comprises the driving handle 6, a lever handle 7 and a slider 8. The slider 8 is installed in the tube of the driving handle 6 and connected to one end of the lever handle 7, while the other end of the lever handle 7 is fixed at the exterior of the tube of the driving handle 6. The top-end of the slider 8 is connected to the bottom-end of the transmission link 5.

The hook of the hook-shaped cutting edge 1 has a slide corresponding to the cutting edge 2. When the pruner is not in use, the safety plate 11 is inserted into the slide.

The number of the connecting links 4 in the transmission part is 1-n, n being any number of links of varying sizes that are required to reach branches to be cut, normally from 2 to about 10. The upper end and the lower end of each connecting link 4 are respectively provided with internal threading and external threading, which are connected one by one as required.

The advantages of the invention are by using the compound casing tubes to achieve rigid axial transmission, the pruner is simple and handy in construction, and accurate and easy in pruning, with its efficiency improved greatly. The portable pruner can be disassembled into several portions easy to carry and assembled at different lengths depending on the requirement, its effects of cutting are dependable, and so it is suitable for pruning branches of various heights in extensive orchards and gardens, while ensuring the safety of the operation. In addition, it is free from such problems as the sliding of branches outwardly, which may occur when the cutting edges of the old-fashioned shears close at a deflected angle.

DETAILED DESCRIPTION OF THE INVENTION

Figure 1:
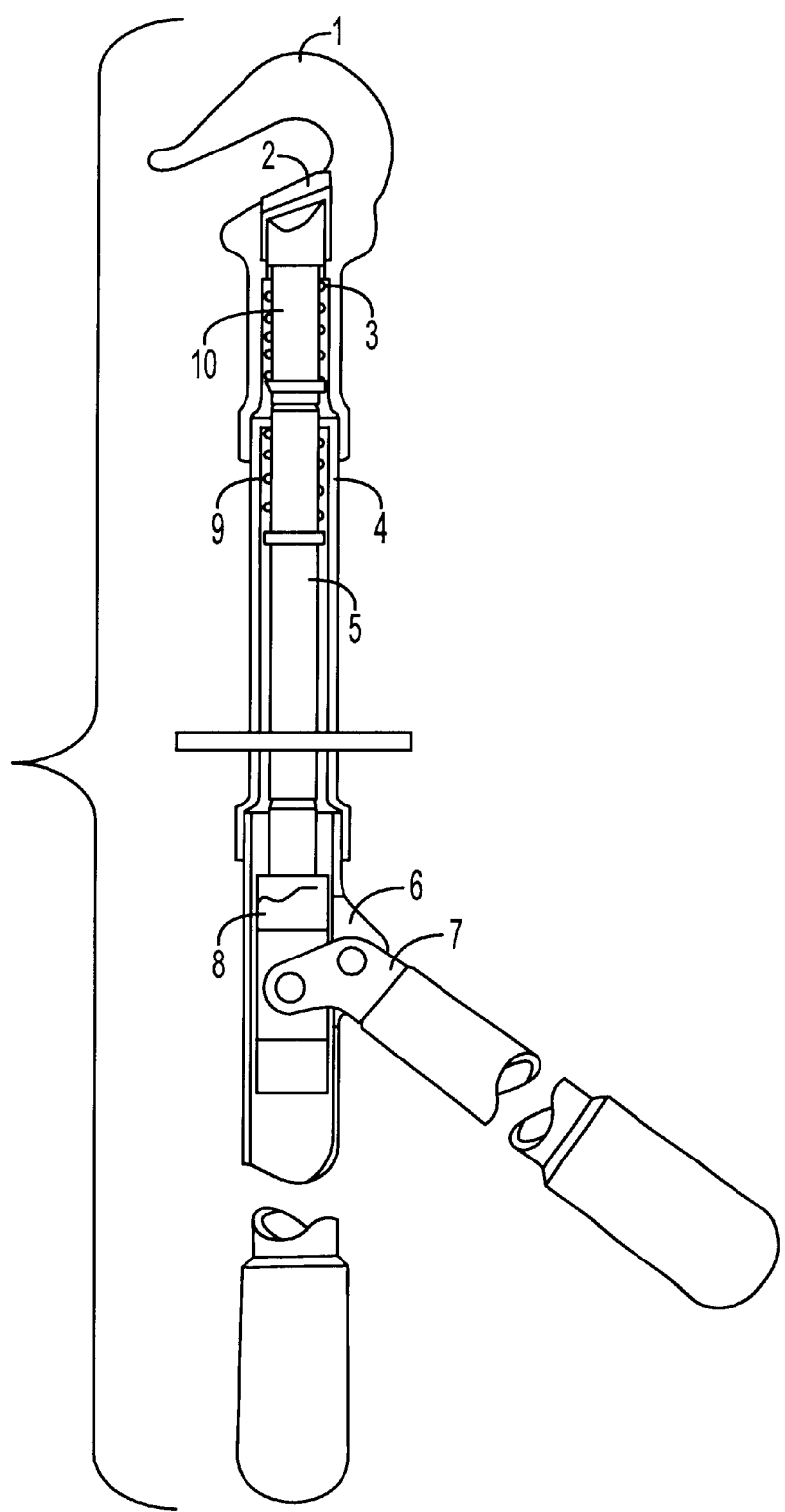
FIG. 1 is a schematic view of the portable pruner.

Referring to FIG. 1, a portable pruner comprises a shearing part, a transmission part and a driving part.

The shearing part comprises a hook-shaped cutting edge 1, a slide cutting edge 2, a slide link 10 and a restoring spring 3. The slide cutting edge 2 is fixed to the top of the slide link 10, which is installed in the tube hole under the hook-shaped cutting edge 1. The bottom of the tube hole and the hook-shaped cutting edge 1 is connected to a connecting link 4 by the threaded coupling;

The transmission part comprises connecting links 4, a transmission link 5 and a restoring spring 3. The transmission link 5 is installed in the inner of the tube, with the exterior of its upper portion fitted with the restoring spring 9 and the top portion connected to the end of the slide link 10. The lower end of the connecting link 4 is connected to a driving handle 6 by the threaded coupling;

The driving part comprises the driving handle 6, a lever handle 7 and a slider 8. The slider 8 is installed in the tube of the driving handle 6 and connected to one end of the lever handle 7, while the other end of the lever handle 7 is fixed at the exterior of the tube of the driving handle 6. The top-end of the slider 8 is connected to the bottom-end of the transmission link 5.

When the two handles are closed, the lever handle 7 forces the slider 8 to slide upward in the tube of the driving handle 6, producing an upward pushing force, which is transmitted to the slide link 10 by the transmission link 5, to push the slide cutting edge 2 to slide in parallel, so as to make the slide cutting edge 2 and the cutting edge of the hook-shaped cutting edge 1 close and cut the branches. By the spring force of the restoring spring 3 and the restoring spring 9, the slide cutting edge 2 returns to the initial position.

Figure 2:
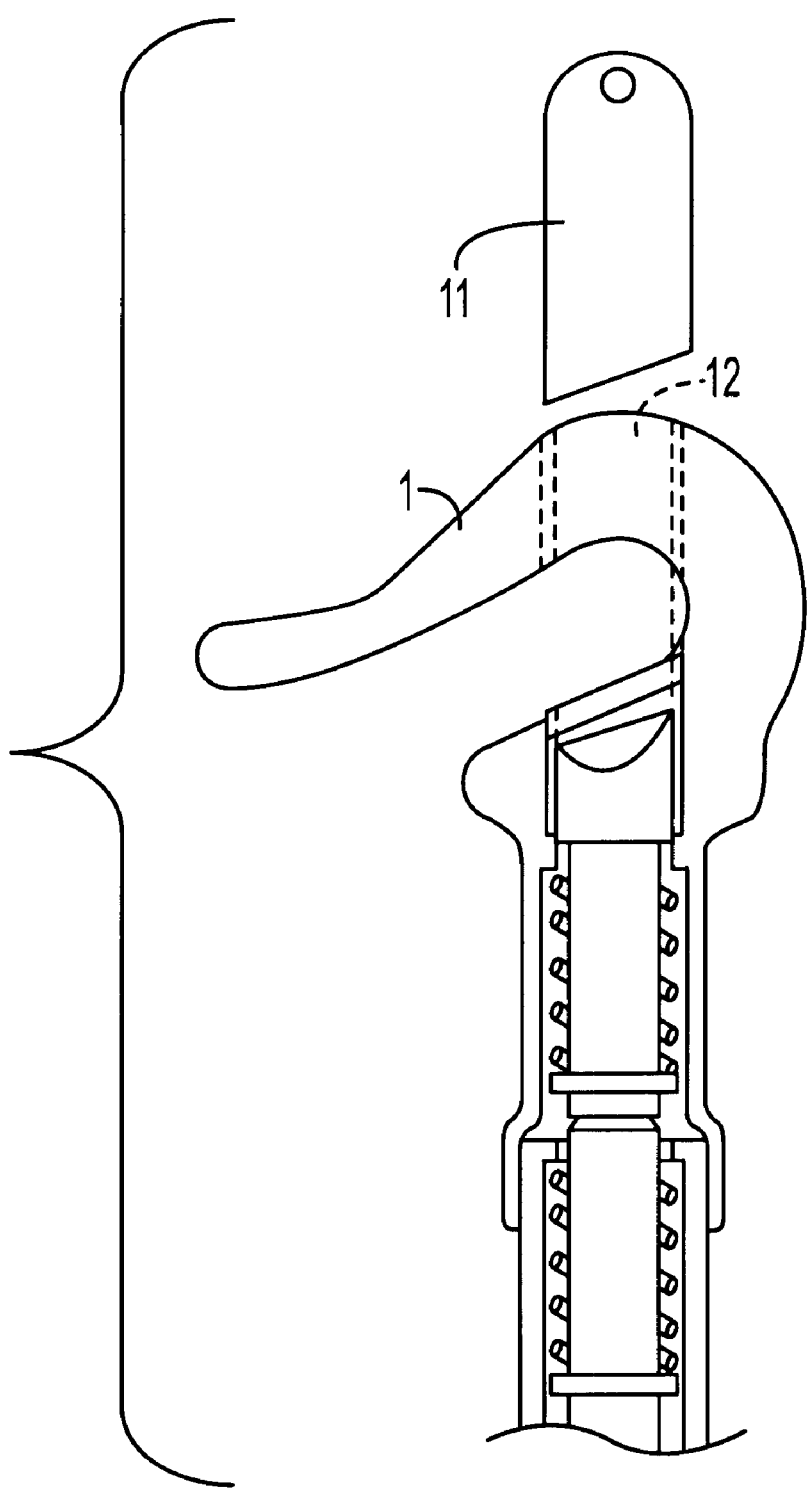
FIG. 2 is an enlarged view of the shearing part and the safety plate.

Referring to FIG. 2, the hook of the hook-shaped cutting edge 1 has a slide corresponding to the cutting edge 2. When the pruner is not in use, the safety plate 11 is inserted into the slide. At this point, the safety plate 11 fills the whole space between the cutting edges of the hook-shaped cutting edge 1 and the slide cutting edge 2, thus preventing the finger and other little things from entering into the space, while ensuring safe operation and protecting the cutting edges.

As shown in FIG. 1, the transmission part of the portable pruner comprises a connecting link 4, the upper end of which is provided with external threading, which is connected with the internal threading of the tube hole at the lower portion of the hook-shaped cutting edge 1, the lower end of the connecting link 4 is provided with internal threading, which is connected with the external threading on the upper portion of the tube of the driving handle 6.

During the pruning operation, the branch to be cut is locked in the inside of the hook-shaped cutting edge 1 and above the slide cutting edge 2. The actual process is to hook the branch at the selected position and close the two handles, as the driving part generates a pushing force. Through the transmission of the transmission part, the slide cutting edge 2 is pushed to slide in parallel and cut the branch. The process of closing the slide cutting edge 2 is a translational motion, without causing such problems as the sliding of branches outwardly and so on, which may occur when the cutting edges of the old-fashioned shears close at a deflected angle.

What is claimed is:

1. A portable pruner comprising a shearing part, a transmission part, and a driving part, wherein the shearing part comprises a hook-shaped cutting edge, a slide cutting edge, a slide link, and a first restoring spring, wherein the slide cutting edge is fixed to a top of the slide link, which is installed in a tube hole formed under the hook-shaped cutting edge, wherein the bottom of the tube hole formed under the hook-shaped cutting edge is connected to a connecting link by a threaded coupling, wherein the transmission part comprises the connecting link, a transmission link, and a second restoring spring, wherein the transmission link is installed inside the connection link, with an upper portion thereof fitted with the second restoring spring, and a top portion thereof is connected to an end of the slide link, wherein a lower end of the connecting link is connected to a driving handle with a threaded coupling;

wherein the driving part comprises the driving handle, a lever handle, and a slider, wherein the slider is installed in a tube of the driving handle and connected to one end of the lever handle, while the other end of the lever handle is fixed at the exterior of the tube of the driving handle, and a top-end of the slider is connected to the bottom-end of the transmission link, and wherein the hook of the hook-shaped cutting edge has a channel aligned with the slide cutting edge for receiving a safety plate when the pruner is not in use.

2. A portable pruner according to claim 1, wherein the number of connecting links in the transmission parts is from 1 to about 10, and the upper end and the lower end of each connecting link are respectively provided with internal threading and external threading, which are connected one by one as required.

3. A portable pruner comprising:

a shearing part having a hooked-shaped portion with an upper cutting edge and a tubular lower portion extending underneath the hooked-shaped portion, the shearing part further including a slide member having a lower cutting edge and a first restoring spring, wherein the lower portion has an opening through which the slide is movable toward and away from the upper cutting edge;

a transmission part having a tubular connecting link coupled to the tubular lower portion of the shearing part, a transmission link movably mounted inside the tubular connecting link, and a second restoring spring, wherein the second restoring spring is positioned on an upper portion of the transmission link, and a top-end of the transmission link connects to a bottom-end of the slide link; and a driving part having a driving handle coupled to the tubular connecting link, a slider movable inside the driving handle, and a lever handle coupled to the driving handle and the slider, wherein a top-end of the slider connects to a bottom-end of the transmission link, wherein the hooked-shaped portion further has a slide for receiving a safety plate for protecting both the upper and lower cutting edges when the pruner is not in use.

\* \* \* \* \*